United States Patent Office 3,526,441
Patented Sept. 1, 1970

3,526,441
AXIAL SEAL
Horst Schulz, Stossdorf, Germany, assignor to Klockner-Humboldt-Deutz Aktiengesellschaft, Cologne-Deutz, Germany
Filed July 24, 1967, Ser. No. 655,519
Claims priority, application Germany, July 23, 1966,
K 59,865
Int. Cl. F16j 15/38
U.S. Cl. 305—11                                6 Claims

ABSTRACT OF THE DISCLOSURE

An axial seal between two members rotatable relative to each other to a limited extent only, especially for the bearing eyes of coupled chain links of a track laying vehicle, according to which an annular member of elastic material is arranged in the recesses of two adjacent bearing eyes of two adjacent chain link side walls. One side of said elastic annular member being by means of a disc non-rotatably arranged in one of said bearing eyes whereas the other side of said elastic annular member is by means of a disc non-rotatably arranged in the other one of said bearing eyes. The invention is characterized primarily in that the discs are formed by elements with a radial spring effect, preferably by conical disc springs engaging said bearing eyes under preload.

---

The present invention relates to an axial seal between two members adapted to be turned relative to each other by a limited angle. More particularly, the invention is directed to an axial seal of the above-mentioned type for bearing eyes of chain links of a track laying vehicle which are coupled to each other by chain bolts, according to which a ring of elastic material is arranged in recesses respectively provided in two adjacent bearings eyes of chain link sidewalls with one side of said ring non-rotatably clamped in one of said bearing eyes while the other side of said ring is non-rotatably clamped in the other one of said bearing eyes, said clamping being effected by means of discs.

According to one heretofore known axial seal of the above-mentioned type, the two end faces of the elastic ring are provided with annular metal discs vulcanized or cemented to said ring, while said metal discs are at their rims by means of a folded-over or spread collar plastically or elastically inserted into the bearing eyes of two adjacent chain links. A seal of this type is practically free from wear-exposed sliding surfaces, so that a good seal and a long life span of the chain are assured. However, experience has shown that difficulties have been encountered in connection with the sealing of the end link and the closure bolt. These difficulties consist in that a disassembly can hardly be effected without destruction of some parts. On the other hand, the above-mentioned heretofore known axial seal requires a special device for bracing the chain, which means additional costs. In view of the limited transferrable torques of the elastic ring, damage to said ring during the transport of the chain is possible because the way in which the disc is connected does not permit a precise safety measure against distortion.

It is, therefore, an object of this invention to provide an axial seal which will overcome the abovementioned drawbacks.

It is another object of this invention to improve an axial seal of the above-mentioned general type and to do so by simple structural means so that a destruction-free disassembly and a highly satisfactory seal for the end link of a track chain, will be assured.

It is still another object of this invention to provide an axial seal as set forth in the preceding paragraphs in which the connecting means for the seal will prevent excessive stress on the chain during the transport thereof.

These and other objects and advantages of the invention will appear more clearly from the following specification in connection with the accompanying drawing, in which.

Figure 1:
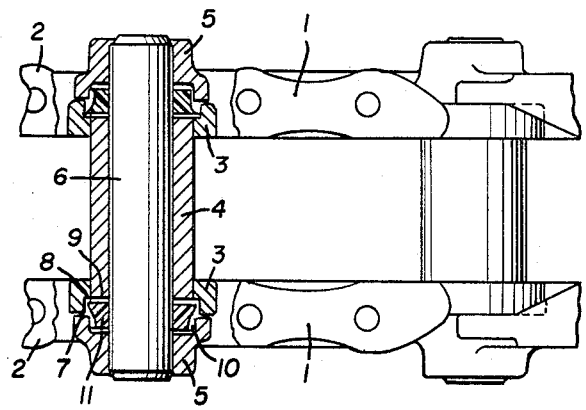
FIG. 1 illustrates a diagrammatic partial section perpendicular to the longitudinal direction of a chain link pertaining to a track chain according to the present invention.

The axial seal according to the present invention is characterized primarily in that the discs by means of which the ring of elastic material is clamped into the above-mentioned recesses are designed as elements with a radial spring effect, and preferably are designed as conical spring discs which are located in the bearing eyes under radial preload.

An axial seal of the design according to the present invention brings about the advantage that it is particularly suitable for sealing the end links of a track chain. In addition thereto there exists the possibility of employing conical spring discs as is customary in the trade, so that the manufacture of the seal is considerably facilitated. Moreover, there is also obtained the advantage that the elastic ring is secured against undue angular turning movement during the transport of the chain, inasmuch as the maximum permissible holding moment can easily be fixed by means of the elastic disc.

In order to permit large radial tolerances for the manufacture of annular recesses of the bearing eyes for the conical spring discs, it is suggested, as a further development of the present invention, that the circumferential or marginal portion of the conical spring discs is recessed in a ray-like manner. This brings about the advantage that for purposes of radially tensioning the conical spring discs in the bearing eyes, it is necessary to employ only low axial forces so that the elastic ring may have a high torsion elasticity, which will have a favorable effect upon the life of the seal. The conical spring discs may, through the intervention of thin discs of elastic material rest against the inner end faces of the bearing eyes. This results in a hermetic seal of the chain link mounting. Instead, there exists also the possibility of making the elastic ring one-piece with the thin discs. This may be effected, for instance, by providing the conical spring discs with passages through which the connection is effected. This last-mentioned design is preferred inasmuch as it permits a simplified stockkeeping.

Referring now to the drawing in detail, the partial chain link coupling of a track chain has offset link sidewalls 1 and 2. The respective inner link sidewalls 1 are provided with bearing eyes 3 having pressed thereinto a chain link bushing 4 forming a connecting element, whereas the ends of a chain bolt 6 are pressed into the bearing eyes 5 of the outer link sidewalls 2. The inner bearing eyes 3 are provided with annular recesses 7 the end faces 8 of which, directed toward the inside, are flush with the end face 9 of the chain link bushing 4. The outer bearing eyes 5 are likewise provided with an annular recess 10 the diameter of which, for reason of a simplified manufacturing process corresponds to the outer diameter of the chain link bushing 4. The recesses 7 and 10 receive the axial seal 11 which, prior to its assembly, has the shape shown in FIG. 2.

Figure 2:
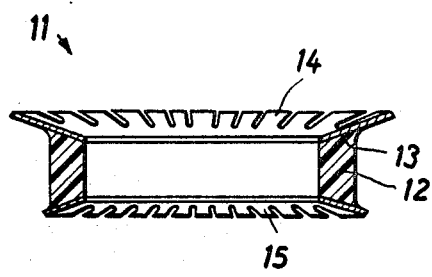
FIG. 2 illustrates on a somewhat larger scale than FIG. 1 an axial seal prior to its assembly.

As will be seen from FIG. 2, the axial seal according to the invention comprises a hose-shaped elastic ring 12 of elastomeric material, the end faces 13 of which are by means of a rubber-metal connection connected with one conical spring disc 14, 15 each the outer circumference of which has recesses extending in the manner of rays. The rubber-metal connection may be effected selectively by cementing, vulcanizing, or the like. The outer diameter of the conical spring discs 14 and 15 is so selected that a slide fit exists between said spring discs and the corresponding inner diameter of said recesses.

The assembly of the axial seal with the track chain is effected in the following manner: First, the link sidewalls 1 of a chain link are interconnected with their inner bearing eyes 3 by pressing in the chain link bushing 4. Thereupon, the chain bolt 6 is passed through the chain link bushing 4. Subsequently, the axial seal 11 with its conical spring disc 14 is inserted into the inner bearing eye 3 of the link sidewall 1, and the link sidewalls 2 of the next chain link are with their outer bearing eyes 5 pressed upon the chain bolt. During this pressing opertaion, the conical spring disc 15 is automatically introduced into the annular recess. The bearing eyes 5 of the chain link sidewalls are pressed upon the chain bolt 6 until their end face rests upon the inner bearing eyes 3 of the link sidewalls 1 with slight play. In view of the axial bracing of the coaxial spring discs 14 and 15 as produced by the bracing operation of the link sidewalls, said spring discs 14 and 15 are pressed flat to such an extent that the spring disc 14 will rest on the end face 9 of the chain link bushing 4 and on the end face 8 of the bearing eye 3, and the spring disc 15 will rest against the bottom of the annular recess 10. In view of the axial bracing of the spring discs 14 and 15, said spring discs are in the corresponding annular recesses 7 and 10 braced radially to such an extent that a non-rotatable connection is established.

Figure 3:
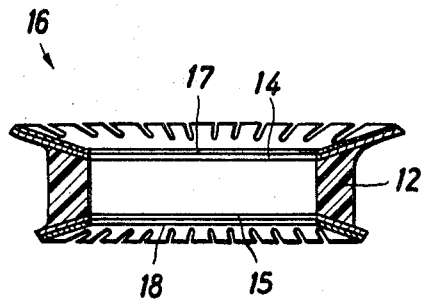
FIG. 3 shows a modification of the axial seal according to FIG. 2.

The axial seal 16 shown in FIG. 3 prior to its assembly differs from that of the seal of FIG. 2 in that the conical spring discs 14 and 15 are coated with a thin elastic layer 17 and 18 of elastomeric material, which, through the marginal recesses is, preferably in one working operation connected to the elastic ring 12.

It is to be understood, of course, that the present invention is, by no means, limited to the particular embodiments shown in the drawing, but also comprises any modifications that will appear to those skilled in the art. In this connection, it may be noted that instead of the conical spring discs with the marginal recesses, also conical discs with a closed circumference may be employed if a sufficient structural volume prevails, as is the case, for instance, with large track chains. Furthermore, there exists the possibility, instead of employing metallic conical spring discs, to employ discs of tough synthetic material as, for instance polyurethane or polyvinylchloride.

What I claim is:

1. An axial sealing member for permitting limited rotary movement of two adjoining chain link members coupled by a chain bolt, said link members having eyes to receive said bolt and recesses facing each other and surrounding said bolt, said sealing member comprising an annular body of elastomeric material and conical discs of resilient sheet material secured to the opposite ends of said annular body with the sides of said discs diverging radially outwardly from said body, said discs being radially expandible when flattened so that said discs when pressed into said recesses will be radially expanded to be secured against rotation in said recesses, said elastomeric material permitting relative movement of said link members.

2. An axial sealing member according to claim 1, which includes further thin discs of elastomeric material respectively arranged on the outside of said first mentioned annular discs and holding the latter firmly against said annular member of elastic material while being non-rotatably connected to said two members.

3. An axial sealing member according to claim 2, in which said thin discs form one integral entity with said annular member of elastic material and consist of the same material as the latter while being connected collectively to each other through said discs.

4. An axial sealing member according to claim 1, in which the outer peripheral portion of each of said discs has approximately radially extending circumferentially substantially evenly distributed narrow slots therein.

5. In combination with two adjoining chain links of a track laying vehicle having aligned eyes to receive a chain bolt connecting said links and recesses facing each other surrounding said bolt, an axial sealing member comprising an annular body of elastomeric material surrounding said bolt between said eyes, resilient conical discs connected to the opposite end faces of said annular member, said discs diverging radially outwardly from said body and being flattened under axial force to expand radially and to engage in said recesses, so that said discs are secured against rotation to said links, said annular member permitting relative angular movement of said links.

6. The combination according to claim 5 in which said discs have radial slots extending outwardly to the periphery to allow expansion of said discs.

References Cited

UNITED STATES PATENTS

| | | | |
|---|---|---|---|
| 2,341,900 | 2/1944 | Boden | 277—92 |
| 3,075,781 | 1/1963 | Atkinson et al. | 277—83 |
| 3,341,259 | 9/1967 | Schulz et al. | 277—92 X |

SAMUEL ROTHBERG, Primary Examiner

U.S. Cl. X.R.

74—255; 277—92, 95; 305—42